Aug. 6, 1940.   R. D. SMITH   2,210,188
SELF-IGNITING FUEL FLOW CONTROL SYSTEM
Original Filed May 18, 1933
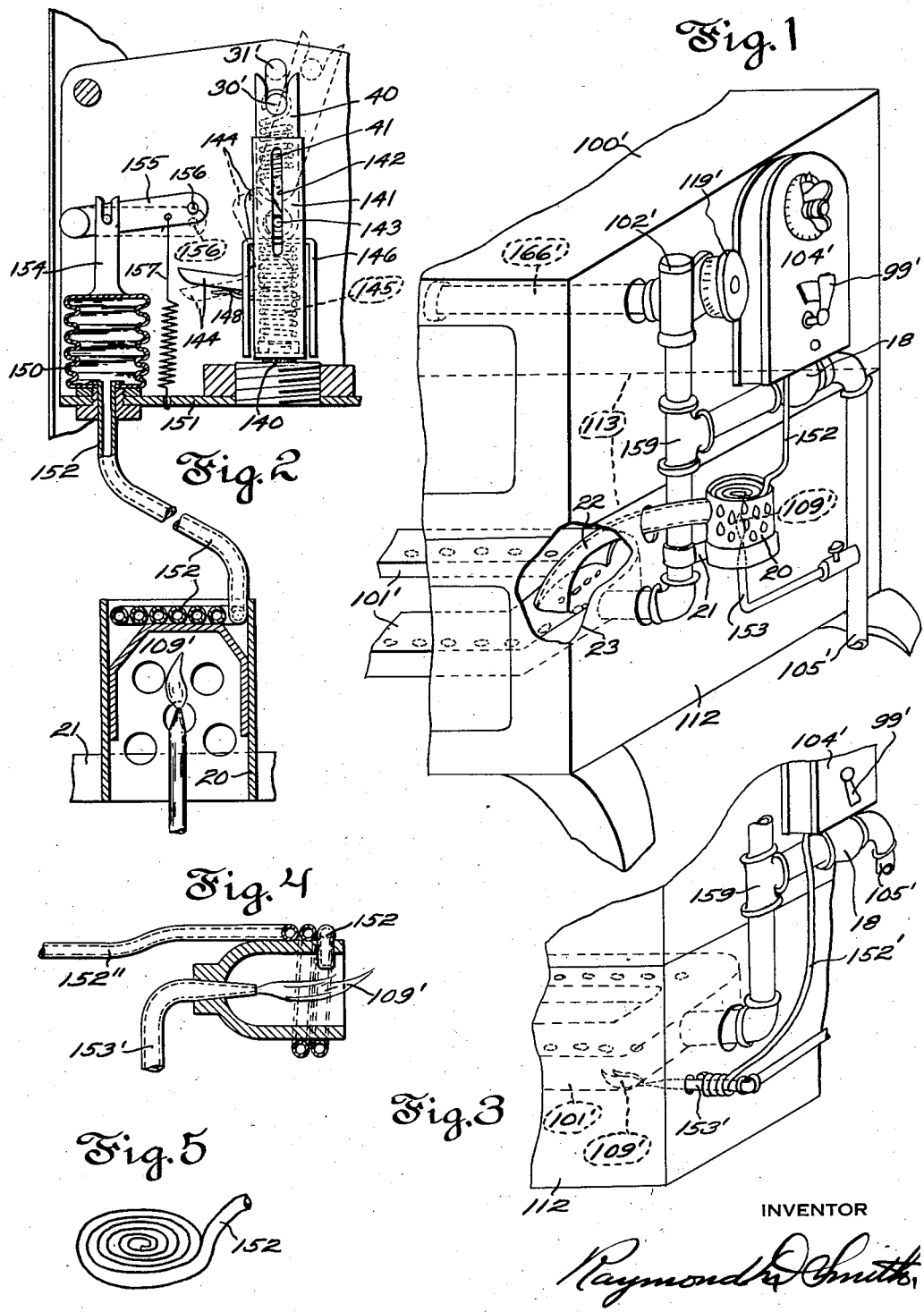
INVENTOR
Raymond D. Smith Patented Aug. 6, 1940

2,210,188

UNITED STATES PATENT OFFICE 2,210,188

SELF-IGNITING FUEL-FLOW CONTROL SYSTEM

Raymond D. Smith, Easton, Conn.

Application May 18, 1933, Serial No. 671,619
Renewed December 22, 1939

1 Claim. (Cl. 158—117.1)

This invention relates broadly to apparatus for controlling automatically the flow of fluids, gases, or other medium or fuel whether or not the apparatus incorporates electrically operated parts, and specifically relates to certain details of controls for governing the flow of a combustible fuel to a burner or burners that may be used for heating air, water or the like employed in the heating of homes or in the cooking of foods or in any process utilizing heat or the medium whose flow is to be so controlled.

A possible use for the present improvements resides in their application to the problems of equipping a domestic gas cooking range with automatic time and temperature controls which in practice gives rise to the need of an associated automatic safety control which will operate to shut off the supply of gas or other fuel automatically in consequence of the extinguishment, accidentally or otherwise, of the so called "pilot" flame commonly employed as the means for igniting a main burner when the gas is turned on through automatic control.

Among the problems above mentioned is the desirability of disposing the pilot flame in reliable igniting relationship to the main burner yet so removed from the zone of the heat generated by the flame of the main burner that a thermostatic element may be disposed in heat sensitive relationship to the pilot flame while being operatively independent of and remote from heat sensitive relationship to the zone of heat generated by the main burner. Such thermostat may then be reliably utilized to effect mechanical action such as the latching or unlatching of certain parts associated with a time controlling mechanism and dependent upon whether the thermostatic element is receiving heat generated solely by the burning of the pilot flame. In some instances the operative effect of the thermostat which is sensitive to the pilot flame may be to automatically shut off the supply of gas to the main burner at any time it is deprived of the heat from the pilot flame thus requiring that the pilot flame at all times be burning in order to secure any supply of gas to the main burner.

Particular details of the present improvement concern the provision of an operating connection between the thermostat which is located close to the pilot flame and the automatic mechanism to be affected by the thermostat when such mechanism is positioned at some distance from the thermostat for convenience of use as a control for the gas range.

Referring to the accompanying drawing:

Fig. 1 shows an ordinary domestic cooking range equipped with a time mechanism control unit incorporated within a system of piping for leading gas to the burners of the range which system also includes a thermostat safety control associated with a pilot flame to prevent the accidental escape of unignited gas.

Fig. 2 shows in central vertical section and on an enlarged scale an advantageous arrangement of safety pilot flame and thermostatic mechanism which may act upon the valve of a time controlling unit such as indicated in Fig. 1.

Fig. 3 is a fragmentary view similar to Fig. 1 indicating a modified form of safety pilot equipment.

Fig. 4 shows a horizontal open ended casing partly surrounding the pilot flame and around which can be coiled a closed fluid tube such as that of Fig. 3.

Fig. 5 is a perspective view of the spirally coiled fluid tube of Fig. 1 removed from the cage of the pilot flame.

Fig. 1 pictures the end portion of a gas range equipped with a time control unit 104' which may be constructed as more completely illustrated and described in my U. S. Patent No. 1,910,450, issued May 23, 1933, incorporating the time controlled valve 18 supported on and controlling the flow of gas through the supply pipe 105' to the temperature regulating valve 159 whence the gas is delivered to the burner 101' of the lower oven or broiler compartment 112 which is separated from the upper oven compartment 100' by the usual sheet metal partition 113. The valve 18 is designed to be manually operated by the timing mechanism of the unit 104' which will hereinafter be more fully described.

In Fig. 1 is also shown operatively associated with the time and temperature control devices a safety pilot flame device located in igniting relation to the burner of the gas range for certain novel advantages over former methods of arranging a pilot flame to ignite the oven burner of a gas stove. It has formerly been the practice to locate an igniting pilot flame burner within the oven or broiler compartment of the range and even aside from the new problems presented by the use of such flame in connection with a safety acting thermostat, a pilot flame so located is commonly known to become accidentally extinguished from the partial explosive action of igniting the enclosed oven burner when there is any appreciable delay in the unignited gases reaching the pilot flame after gas has been turned on to the main oven burner.

Other undesirable results of placing an igniting pilot flame within a walled-in compartment of the range reside in the deterioration of the pilot flame burner from its subjection to the heat zone of the main oven burner, and in the lack of visibility of a pilot flame so located that it cannot readily be seen whether the pilot flame is actually burning or may have been extinguished by some temporary condition of low gas pressure in the mains. Accidents from explosion of unignited or belated ignition of gas in the walled-in compartment of a gas range are common occurrences and one of the recognized dangers of the handling of a gas range in the home.

I, therefore, have located the pilot flame 109' entirely outside of any walled-in compartment associated with the oven burner which requires therefor the provision of novel and effective means for enabling such pilot flame to ignite the oven burner when positioned so remote therefrom. For this purpose I provide the flame protective cage 20, supported by a bracket 21 to encompass the pilot flame 109'. A hood-like conduit 22 extends from the cage 20 through the compartment wall 23 which wall is shown as partly broken away. The conduit 22 flares at its lower end and is suitably disposed and formed above oven burner 101' to receive and collect unignited gases arising from said burner and to direct them and lead them and deliver them to a point within the cage 20 into igniting proximity to the pilot flame 109' substantially in the presence of free air whereupon these unignited gases rising from burner 101' flash back by flame propagation through the conduit 22 and quickly and reliably ignite the oven burner 101'. I am thus enabled to gain the advantages of being able easily to detect at all times whether the igniting pilot flame is burning before turning on the gas, and of locating the pilot burner entirely outside the zone of heat of the oven burner so that use can be made of the heat zone of the pilot flame alone to operate my safety thermostat unaffected by the heat of the main oven burner which otherwise would make this a difficult if not impossible accomplishment. I gain the further advantage of relieving the oven from the heating effect of a permanently burning pilot flame. This was of no object prior to the introduction of time control to the domestic cooking of food, but under the modern practice of placing an uncooked meal in the range oven early in the day, and setting the clock or time controlled valve to automatically turn on the gas later in the day to start the cooking, even the temperature brought about by the heat of the pilot flame is highly objectionable in the range oven prior to the beginning of the cooking, because the foods having milk content or other temperature sensitive ingredients tend to deteriorate before their designed time for cooking begins. It thus becomes plain that it is of advantage to relieve the oven of any preliminary heating effects of the pilot flame and this is accomplished very effectively by the disposition of the pilot flame burner 153 removed from its usual walled-in position in or below the oven. The feature of the igniting pilot flame arrangement for the oven burner as shown in Fig. 1 is therefore a distinct improvement aside from its uses in connection with the safety thermostatic controls elsewhere described herein.

In Fig. 2 the valve operating, time controlled crank member 30' is pivoted at 31' and is provided with an extendible pitman arrangement of parts which enable rotations of the crank 30' to raise and lower the valve stem 140 of the valve 18 thereby respectively to open and close the valve at each successive half turn of the crank 30'. Trippable latch means are provided as a part of the pitman mechanism whereby at any time the valve is held open by the time mechanism and the pilot flame should become extinguished, the pitman will be tripped to cause it to extend its length as a means of closing the valve for safety purposes independently of the timing mechanism. These pitman parts include a U-shaped, upwardly disposed extension 141 secured rigidly to the valve stem 140 in each vertical leg of which is a slot like that appearing at 142 in the nearest leg in Fig. 2. A roller 143 has fixed thereto the upright thrust bars 40, the upper forked ends of which engage the crank 30 pivotally. An extension spring 41 connects roller 143 with crank 30 to maintain the thrust engagement of bars 40 against crank 30, and roller 143 is guided at each end for up and down movement in the slots 142 and its up and down movements as caused by successive half rotations of crank 30' are ordinarily accompanied by an equal up and down movement of the valve stem 140 because a bell crank latch 144 pivoted to the stem extension 141 hooks over a pin-like extension of the roller 143 and holds the roller 143 from moving upward in the slots 142. A strong coiled spring 145 tends to expand lengthwise for causing a lengthwise separation of the roller 143 from its normal latched relation to the valve stem extension 141 thereby to increase the effective length of the pitman structure as a whole and so acts when latch 144 is disengaged from the projecting guide pin of roller 143 by downward pressure upon the horizontal arm of bell-crank latch 144 shown extending to the left. Guiding enclosure for the compression spring 145 is completed by the inverted U-shaped retainer 146. Thermostatic means then may act to position a trip 156 for the bell crank latch 144 to cause the compound pitman to elongate and close the valve if a pilot flame to which the thermostat is sensitive should become extinguished. The above described and other parts and functions of the valve operating mechanism are fully disclosed in my said U. S. Patent No. 1,910,450.

The thermodynamic device consists of a Sylphon or fluid-filled bellows 150 mounted at its bottom upon a frame shelf 151 through which extends the fluid tight conduit 152 which communicates with the sealed interior of the bellows thermostat 150 but which is itself sealed at its remote end and thereat placed in heat sensitive relationship to the igniting pilot flame or some part heated thereby. This may be accomplished by coiling the remote and sealed terminus of conduit 152 and supporting it within and at the top of cage 20, or the same might be wound about the pipe 153' which conducts gas to the safety pilot burner and hence becomes warmed by the heat of the safety pilot flame at points near the said pilot burner. Fig. 3 shows the safety pilot flame located within the oven 112 in position to directly ignite the oven burner 101' and shows the heat sensitive coil of conduit 152' outside said oven, the pilot burner pipe 153' running through the wall thereof. When the bellows 150 is expanded because of the fluid contained within conduit 152 being warmed by the burning of the pilot flame, the upright forked bar 154 of bellows 150 is raised to hold the arm 155 in its full line position in Fig. 3 wherein the trip pin 156 carried at the free extremity of said arm is lifted out of possibility of engagement with the tripping extension of bell crank latch 144 on the pitman parts. But should the contained fluid of conduit 152 cool down from extinguishment of the pilot flame a partial collapsing of the bellows 150 would permit spring 157 to pull down on arm 155 and lower trip pin 156 to its broken line position in Fig. 2 wherein the bell crank pitman latch 144 will be tripped whenever it is in its uppermost, or "valve-open" position, thereupon effecting an automatic closure of the valve in case the pilot flame is extinguished and also baffling any attempts to manually open the valve 18 by handle 99' so long as trip pin 156 is lowered as caused by a cool fluid in the conduit 152. In this case, each time the crank 30' attempts to pull the pitman upward as a whole and thus lift the valve stem to open the valve, the bell crank latch projection will encounter the trip pin 156 before reaching its uppermost position with the result that unlatching of parts 144 and 143 immediately occurs and the valve snaps closed under the impulse of spring 145. Relatching of parts 144 and 143 is always taken care of by a leaf spring 148 constantly urging latch 144 in clockwise direction in Fig. 2 except when overcome by the action of trip pin 156 for unlatching.

I claim:

A pilot flame remote safety control embodying in combination with a pilot flame burner, means to define a heat zone warmed by the burning of said pilot flame, a fluid filled bellows arranged to expand and thereby produce mechanical movement at a point remote from said pilot flame and having a portion of its fluid containing chamber extended into said heat zone of the pilot flame.

RAYMOND D. SMITH.